XR 3,718,761

United States Patent [11] 3,718,761

Myer [45] Feb. 27, 1973

[54] OMNIDIRECTIONAL PLANAR OPTICAL CODE READER

[75] Inventor: Jon H. Myer, Woodland Hills, Calif.

[73] Assignee: Hughes Aircraft Company, Culver City, Calif.

[22] Filed: March 27, 1968

[21] Appl. No.: 718,981

[52] U.S. Cl..................178/7.6, 178/DIG. 27, 350/6, 350/7, 235/61.11 E

[51] Int. Cl...............................................H04n 1/04

[58] Field of Search.........178/7.6, DIG. 27; 350/6, 7, 350/285; 250/235, 236; 235/61.11 E; 356/71

[56] References Cited

UNITED STATES PATENTS

| | | | |
|---|---|---|---|
| 3,109,933 | 11/1963 | Baumann | 235/61.11 E |
| 3,414,731 | 12/1968 | Sperry | 235/61.11 E |
| 3,502,803 | 3/1970 | Bigenwald | 178/6 |
| 3,511,571 | 5/1970 | Ogle | 356/71 |
| 2,163,543 | 6/1939 | Clothier | 178/7.6 |
| 3,350,156 | 10/1967 | Adams | 250/236 |
| 3,457,422 | 7/1969 | Rottmann | 350/6 |

FOREIGN PATENTS OR APPLICATIONS

| | | | |
|---|---|---|---|
| 6,513 | 6/1933 | Australia | 178/7.6 |
| 374,564 | 6/1932 | Great Britain | 178/7.6 |

*Primary Examiner*—Robert L. Griffin
*Assistant Examiner*—Joseph A. Orsino, Jr.
*Attorney*—James K. Haskell and Lewis B. Sternfels

[57] ABSTRACT

An optical system for reading graphic codes, regardless of their orientation in a plane, includes apparatus for generating a scan of a shaped light beam and rotating the scan on and across targets having a code for transmission of the code to a detector. Alternatively, the code of the target may be included within the beam which is scanned across and rotated on the detector. In both cases, the beam is so dimensioned as to enable proper reading of the code. Such reading is useful in inventorying, cataloging, and tabulating goods such as items in warehouses, factories, supply depots and various commercial retail outlets such as supermarkets.

41 Claims, 11 Drawing Figures

3718761
OR IN 235/61.11R

Jon H. Myer,
INVENTOR.

Eric T. S. Chung

ATTORNEY.

Jon H. Myer,
INVENTOR.
BY.
Eric S. Chung
ATTORNEY.

Jon H. Myer,
INVENTOR.
BY.
Eric B. Chung
ATTORNEY.

Jon H. Myer,
INVENTOR.
BY.
[signature]
ATTORNEY.

Jon H. Myer,
INVENTOR.
BY.
Eric S. Chung
ATTORNEY.

Jon H. Myer,
INVENTOR.
BY.
Eric T.S. Chung
ATTORNEY.

OMNIDIRECTIONAL PLANAR OPTICAL CODE READER

BACKGROUND OF THE INVENTION:

This invention relates to a system for traversing a beam of light or other electro-magnetic energy radiation, along or with information contained therein, through a rotating lineal scan pattern, in order that the beam be scanned sequentially and that the scanning be rotated 360° so as to provide beam movement in all possible planar directions. More particularly, the invention is directed to a system for sweeping a shaped light beam through a lineal scan which scan is rotated through a predetermined angle subsequent to each sweep so as to produce an omnidirectional scanning motion on a two dimensional plane. The invention is particularly useful for reading directive graphic codes, containing bits of information, without regard to the physical orientation of the code or an object or target bearing the code.

Many modern business and military activities involve the task of inventorying, cataloging and tabulating massive quantities of goods such as items in warehouses, factories, supply depots and various other commercial retail outlets such as supermarkets. Customarily, these tasks of inventorying, cataloging or tabulating are done manually and, as a consequence, implicitly involve the consumption of excessive amounts of time, the need for a sizeable work force and the opportunity for the introduction of human error.

Various mechanical and electronic code and character reading schemes have been proposed heretofore as substitutes for the wearisome and time-consuming task of manually cataloging and tabulating great quantities of goods; but such proposed alternatives have generally been unacceptable due to a combination of factors such as cost, complexity of construction, difficulty in maintenance, and lack of simple mode of operation. When the items to be inventoried by these prior art systems are given some kind of coding indicia, a critical orientation of each such coded item is necessary for the code to be read.

A video scanning technique using a television camera or the equivalent is among the more widely known possible code and character reading schemes. This technique, however, involves such disadvantages as expense, complexity, the need for highly-trained technicians to perform maintenance, and the relatively short useful life of the camera electrooptical components.

Reading systems including the use of radio waves have also been proposed and considered. These systems, however, involve difficult resolution and noise problems in addition to the requirement for specialized maintenance due to the complexity of the involved radio transmitting and receiving equipment.

Other proposals have been directed to the employment of magnetic techniques. Such proposals, however, have generally involved complex systems which comprise component parts having limited useful lives, for example, reading heads. Additionally, such techniques are susceptible to the accidental erasure of recorded information.

Various systems employing light energy have been proposed. Exemplary, is a system including an optical scanner situated to view a counter surface upon which surface coded articles may be placed for reading. These systems have generally been unacceptable due to problems involving difficulty in focusing due to varying target distances which difficulties have resulted in reduced speed of operation and the need for an automatically adjustable lens system. Expense and complexity of construction leading to increased maintenance cost have also provided disadvantages. The greatest disadvantage, however, has been the requirement that the coded object to be read be oriented in a particular predetermined position relative to the scanning light beam of the reading apparatus, for example, the code or characters or bits of information contained therein to be read being necessarily situated orthogonal to the direction of scan, due to the inherent sensitivity to orientation of the system.

In order to solve the problem of orientation, effort, has been directed towards the development of coding techniques. These efforts, while leading to advances in the art of coding, have generally been unsuccessful in providing an acceptable solution. Of the many coding techniques developed as a result of the aforementioned efforts, the most familiar technique involves color coding the indicia to be read.

The present invention, when used as a reading device, enables a coded word having directional characteristics, such as a directive graphic code consisting of a series of juxtaposed bars, corresponding to bits of information, to be read regardless of the physical orientation or position of the coded object when it is situated within the bounds of an observation plane or a scanned target area. As such, the subject invention, when employed as a code reading device, presents the advantage of not requiring the critical orientation of a coded item for a code and each bit of information placed thereon to be read.

SUMMARY OF THE INVENTION

Briefly described, the present invention involves a system including apparatus for sweeping a pattern comprising a beam of electromagnetic energy radiation, such as light, either containing information or having an elongate transverse cross-section, respectively, across a reader aperture or a target area containing the information or code in a manner such that the scan or sweep of the pattern of said beam of light is rotated through a pre-determined angular increment after each succeeding sweep, the result being that the reader aperture or coded target area is successively scanned in a plurality of different directions or omnidirectionally.

More particularly, the desired result is accomplished, in accordance with one embodiment of the invention, by directing a shaped beam of light shaped by a mask at a rotating mirror drum which causes the shaped beam of light to be scanned across a reflecting prism such as a Dove prism or its equivalent e.g., a K-mirror which reflecting prism has the quality of totally internally reflecting incident light rays an odd number of times and which is adapted to be rotated about its longitudinal axis. Light rays emerging from the reflecting prism, when projected at a target area, will be successively or sequentially scanned across the target area in a plurality of directions, each successive direction being displaced by rotation through a predetermined angle about and in a plane normal to an axis extending from the plane of the target area after each previous scan. When the target area supports a target having a code or information thereon, the rotating scan picks up the code for transmission to a reader. Furthermore, when the code is composed of bits of information, the mask must be so dimensioned as to permit only one bit of information to be read at one time.

In another embodiment the target area, containing the information or code, is irradiated by the electromagnetic energy radiation to produce a pattern, which by definition is a coded beam since it contains the information. The pattern is then rotated and scanned, or vice-versa, as described above, for transmission to an appropriate reader through an aperture or mask configured similarly to at least a portion of the pattern. When the code contains bits of information, the aperture is made only so large as to permit one bit of information at a time to be forwarded to the reader.

Consequently, as used herein, the pattern is defined, first, as a beam having an elongate transverse cross-section which is generated into a scan which scan is rotated across and on a coded target and, second, as a beam containing the code of a target which is scanned and rotated. In both cases, the beam is transmitted to a reader which, in the latter case, must be provided with an aperture.

It is therefore an object of the present invention to provide a rotatable scanning pattern.

A further object of this invention is to provide a device for successively scanning a beam of electromagnetic energy radiation across a reader or reader aperture in a plurality of directions.

Another object of this invention is to provide an improved optical reader system.

Another object of this invention is to provide an optical reader system capable of reading directive graphic codes or the bits of information contained therein which system is insensitive to the placement of the codes when situated for reading within the periphery of a prescribed target area.

Another object of this invention is to provide an optical reader system capable of reading directive graphic codes which system is insensitive to the orientation of the codes when situated for reading.

Still another object of this invention is to provide an optical reader system suitable for use as a code reader which is inexpensive and simple in construction.

A still further object of this invention is to provide a device suitable for use as a code reader having a simple mode of operation.

DESCRIPTION OF THE DRAWINGS

Other objects and many of the attendant advantages of this invention will be more readily appreciated as the same becomes better understood by reference to the following exemplary detailed description and considered in connection with the accompanying drawings in which like reference symbols designate like parts throughout the figures thereof and wherein.

Figure 5A:
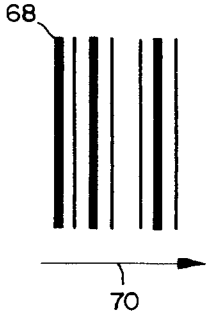
FIGS. 5*a*, 5*b*, and 5*c* are graphical representations of exemplary graphic codes, containing bits of information, which may be employed in conjunction with the optical code reader in accordance with the invention.

DESCRIPTION OF THE PREFERRED EMBODIMENTS:

In optical reader systems employed to read a directive graphic code, for example, comprising a plurality of bars, representing bits of information, as illustrated in FIG. 5*a*, which will be later described in greater detail, it is desirable to use electromagnetic energy radiation, such as light, which will provide a degree of target illumination sufficient to enable detection by conventional photodetectors. A shaped light beam having an elongate transverse cross-section, conforming to each bar of the code of FIG. 5*a*, is particularly suitable for this purpose. However, when employed to illuminate a code having directional characteristics such as the directive graphic code depicted in FIG. 5*a*, the length of the transverse cross-section should be oriented substantially parallel to the individual bars 68, and scanned across the code in a direction normal to the length of the bars 68 as indicated by the arrow 70. Heretofore, it was thus required that the coded object be particularly placed in alignment with the directional scan pattern of the optical reader.

The optical reader system of the present invention eliminates the requirement of particularly aligning the directive graphic code. In one embodiment a novel rotatable scanner successively scans or sweeps a shaped light beam across a target area having the code in a plurality of different directions or omnidirectionally such that the graphic code on a coded object or target, when placed at the target area, can be read without regard to the placement and orientation of the graphic code within the periphery of the aperture. In another embodiment, the light beam irradiates the code which is then rotated and scanned.

Figure 1:
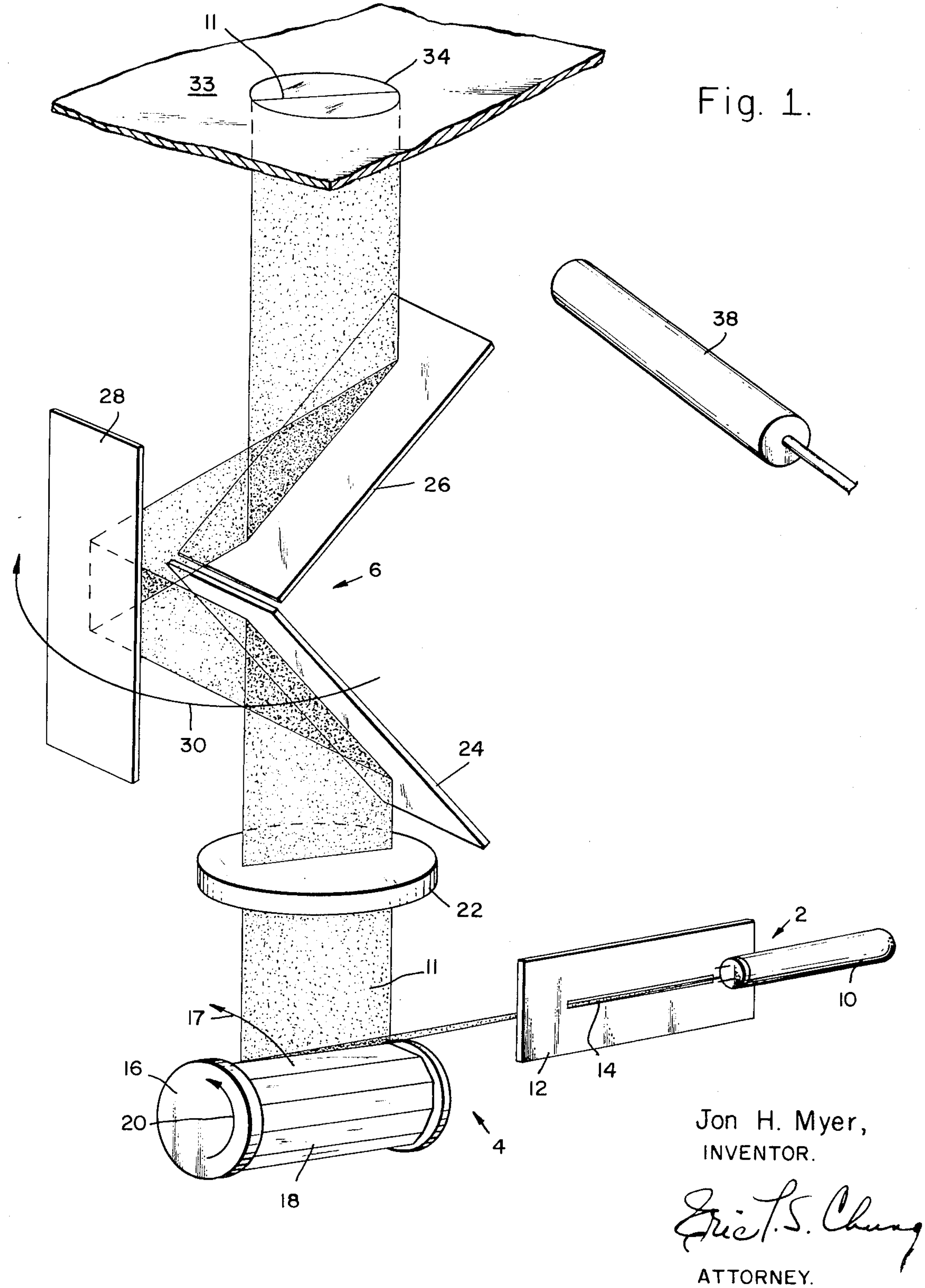
FIG. 1 is an isometric schematic diagram illustrating a first embodiment of an optical code reader including a rotatable bar pattern scanner in accordance with the invention.
Figure 2:
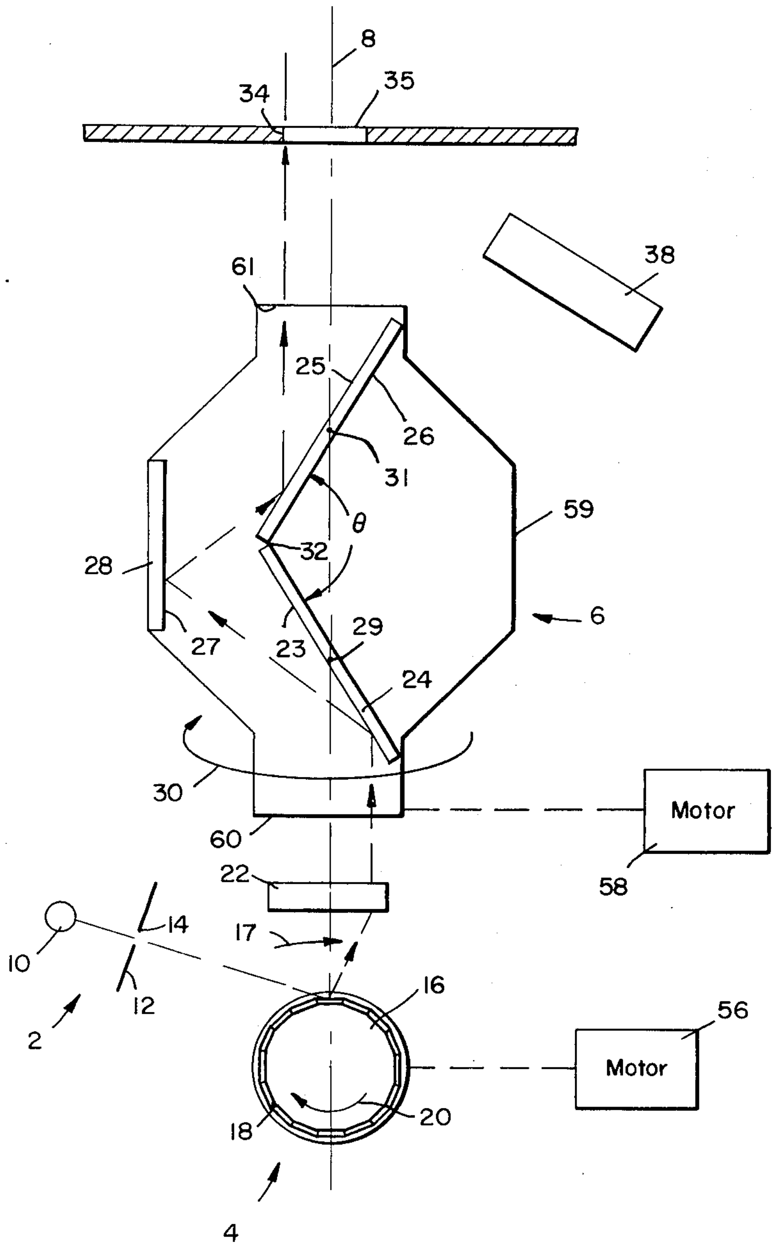
FIG. 2 is a schematic diagram illustrating a cross-sectional side view of the embodiment shown in FIG. 1.

Referring to FIGS. 1 and 2 of the drawings, the major components of the rotatable bar scanner include: a shaped beam generator 2 for providing a pattern comprising a shaped light beam 11 having an elongate transverse cross-section conforming to the information to be read; a beam pattern scanner 4 for causing the shaped light beam 11 to be scanned through a lineal scan in a direction indicated by the arrow 17, which direction is illustrated as normal to the longer cross-sectional transverse dimension or width of the light beam 11; and a scan rotator 6 for modifying the scan direction of said light beam by rotation about and in a plane normal to the longitudinal axis of the scan rotator 6.

The shaped beam or pattern generator 2 may include, for example, in accordance with the invention, a light source 10 and an opaque mask 12 having an elongate slit 14 through which light is projected to thereby form the pattern configured as a shaped light beam.

It is noted that while the slit 14 is illustrated as being a bar or rectangular shape, the slit 14 may have any other suitable shape, such as that of a curved or oscillating line. This may be desirable if the lineal indicia forming a directive graphic code are other than bar-shaped, since the use of a slit shape which matches or generally conforms to the configuration of the lineal indicia, provides maximum variations in the reflected light intensity when the rotatable bar scanner is employed in a code reader, as is later described. For purposes relating to the specific use of the present invention, the dimensions of the beam must not be any greater than the bit of information to be read; otherwise, no meaningful reading could be obtained. Since the dimensions of slit 14 control the dimensions of the beam, the slit must be correspondingly carefully dimensioned.

Any of the conventional types of lamps well known in the prior art may be used as the light source 10, a line filament lamp, Chicago Miniature Lamp Works, Type CM8, being an exemplary light source particularly suitable for use. It is understood that it would be within the scope and spirit of the invention to employ radiant energy having any desirable spectral distribution of any electromagnetic energy radiation such as may be provided by conventional sources or which may be provided for by the appropriate employment of any of the various conventional and well known light sources and filters or combinations thereof. For convenience, however, source 10 is particularly described as a light source.

The beam scanner 4 may include, for example, a mirror drum 16 having a polygonal periphery having affixed thereto a plurality of reflecting elements such as the first surface rectangular mirrors 18 which are uniformly secured in juxtaposed relationship, each of the mirrors 18 extending the full length of the drum 16 so as to form a continuous reflecting surface including a plurality of contiguous sections. The drum 16 is adapted to be rotated about its longitudinal axis in a direction generally indicated by the arrow 20, a motor 56 of conventional design employed in combination with appropriate coupling of any of the conventional types well known in the prior art being suitable for this purpose. It is understood that it would be within the scope and spirit of the invention to use any other suitable method in constructing the mirror drum 16, for example, employing a monolithic multifaceted glass or plastic structure.

The rotator 6 for rotating the scanned pattern may include, for example, a reflecting prism characterized by the quality of totally internally reflecting incident light rays an odd number of times prior to emergence therefrom, exemplary reflecting prisms being a Dove or Pechan prism, which are described in the McGraw-Hill Encyclopedia of Science and Technology, McGraw-Hill Book Co., Inc., 1960, Vol. 8, Page 508. As an alternative, a mirror complex constructed to simulate the characteristics of the aforementioned prisms may be employed as a scan rotator, such employment being particularly suitable in cases where a large prism is required and is thus impractical due to weight and the difficulty of obtaining a flawless prism. Such a mirror complex is employed in a preferred embodiment of the rotatable bar scanner depicted by FIGS. 1 and 2, in accordance with the invention. Thus, with reference to FIGS. 1 and 2 of the drawings, the rotator 6 includes three reflecting elements such as first surface mirrors 24, 26, and 28 respectively having planar reflecting surfaces 23, 25, and 27. The mirrors are oriented relative to each other in a K-shaped configuration wherein the mirrors 24 and 26 are aligned in end-to-end generally angular adjacency with planar surfaces 23, 25, and 27 situated in a plane orthogonal to a common plane. Axis B of rotator 6 extends through the center points 29 and 31 of the mirrors 24 and 26, respectively, which center points 29 and 31 are equidistant from the respective edges of the mirrors 24 and 26. The mirror 28 is situated parallel to the axis 8 and displaced from the apex 32 in centered tangential proximity thereto. Each of the mirrors may be suitably mounted and retained in an appropriate housing 59 adapted to be rotated about its longitudinal axis, which in this case is the axis 8, by a suitable motor 58 and appropriate mechanical coupling. The housing 59 may include two annular ends 60 and 61 through which a light beam, such as the shaped light beam 11, may pass towards the mirror 24 and be reflected from the mirror 26, respectively. An exemplary angle $\theta$ useable between the mirrors 24 and 26 would be 120°, however, the angle $\theta$ may be varied as is practical and desirable to modify the physical configuration of the mirror complex.

Operationally, the beam pattern generator 2 is situated relative to the beam scanner 4 such that the shaped light beam 11 is directed at the mirrors 18 in a direction parallel to the axis of the mirror drum 16, i.e., the axis of slit 14 is parallel to the drum axis. Rotation of the mirror drum 16 about its longitudinal axis in a direction such as indicated by the arrow 20 generates a scan of the pattern by causing the light beam pattern 11 to be repeatedly scanned or swept, at a constant angular velocity and in a direction indicated by the arrow 17, across the surface 23 of the mirror 24 retained in the suitably oriented housing 59, the light beam 11 being successively reflected by each succeeding mirror 18 as the drum 16 is rotated.

Orientation of the length of the transverse cross-section of the light beam 11 with respect to the direction in which the light beam 11 is scanned or swept is controlled by the orientation of the slit 14 of the mask 12. For example, when the slit 14 is situated parallel to the longitudinal axis of the mirror drum 16, as illustrated by FIGS. 1 and 2, the transverse cross-section is orthogonally oriented with respect to the direction of the scan. Thus, by varying the orientation of the slit 14 with respect to the longitudinal axis of mirror drum 16, the orientation of the length of the transverse cross-section with respect to the direction of scan may be varied.

Rotation of the scan rotator 6 about its longitudinal axis, which is superposed with the axis 8, will cause incident images, such as the scan of the pattern produced by the beam scanner 4, upon passage through the mirror complex retained in the housing 59, to be angularly displaced or rotated, thereby generating rotation of the scan of the pattern. Such a rotating scan pattern will enable a target area 34 to be successively scanned in a plurality of different directions.

Figure 4A:
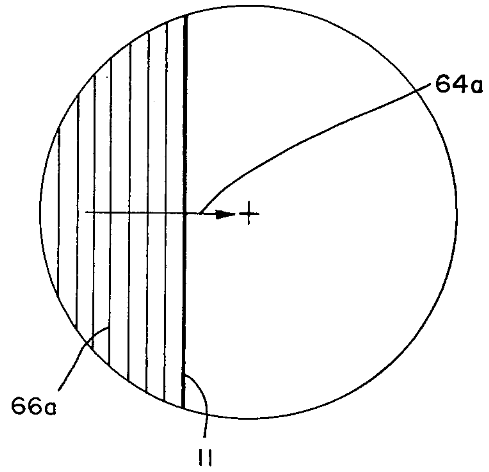
FIGS. 4*a*, 4*b*, and 4*c* are graphical representations of the scan patterns produced by rotatable bar pattern scanners in accordance with the invention, each bar representing a bit of coded information.
Figure 4B:
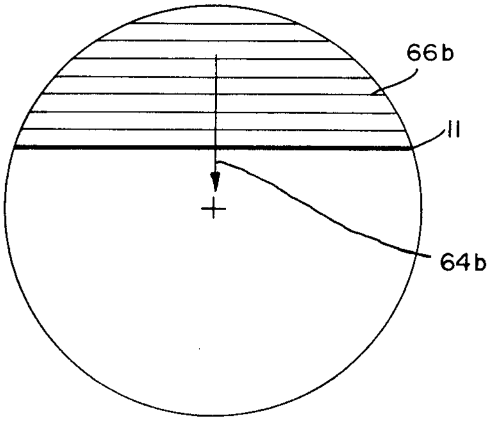

The desired angular displacement or rotation is produced by the rotatable mirror complex comprising the mirrors 24, 26, and 28 which is constructed to simulate the characteristics of the aforementioned reflecting prisms. Light images entering the annular end 60 of the housing 59 will be angularly displaced or rotated in a plane normal to and about the axis 8 by the beam pattern scan rotator 6 through an angle twice the angular rotation of the scan rotator 6. For example, if the scan rotator is rotated 45°, images entering the annular end 60 will be rotated 90° upon emerging from housing 59 through end 61. Referring to FIG. 4, the scanned pattern produced by the beam pattern scanner is illustrated as a series of parallel line images 66a, having a configuration conforming to the specific configuration of the bits of information, e.g., shown as bars in FIG. 5. Line images 66a are successively formed by the traversal of the shaped beam or pattern 11 across a target area 34 in a direction indicated by an arrow 64*a*. Rotation of the rotator 6 through an angle of 45° will cause the scan produced by the beam scanner 4 to be rotated through 90° as is illustrated by FIG. 4*b*, wherein the line images 66b of the pattern have been rotated 90° relative to the line images 66*a*. It is important to note that the direction of scan indicated by the arrow 64*a*, is also rotated 90°, the bar-shaped light beam pattern 11 being scanned in a direction indicated by the arrow 64*b* as a result of the exemplary 45° rotation of scan rotator 6. Notably, for the purpose of illustrating the scanning motion of the light beam 11, a plurality of line images 66*a* and 66*b* have been shown in FIGS. 4*a* and 4*b*, respectively. However, only one line image will ordinarily appear within the target area 34 at any given time.

The scan rate of the light beam 11 and the rotation rate of the scans depicted in FIGS. 4*a* and 4*b* may be controlled by appropriately adjusting the respective rotation rates of the mirror drum 16 and the mirror housing 59. It is preferred that the mirror drum 16 be rotated at a rate which is a multiple of the rotation rate of the mirror housing 59 such that the light beam 11 traverses an illuminated aperture prior to each succeeding incremental angular change in the direction of scan. For example, if a one degree incremental angular change is desired between successive scans, the light beam 11 must traverse the aperture 360 times for each complete rotation of the mirror housing 59.

When employed as a code reader, the pattern scan rotater of the present invention is adapted to direct the light beam pattern 11 through target area 34 in a supporting surface member 33, such as a table top or counter surface, which is situated parallel to a plane normal to the axis 8. A circular transparent glass plate may be appropriately supported in the area 34 which is centered on the axis 8. A lens 22 having a suitable depth of field may be employed to focus the scanning light beam 11 along a focal surface 35 (see FIG. 2) while a photodetector 38 of any of the conventional types well known in the prior art may be employed as a detection device and used in conjunction with appropriate processing apparatus (not shown). A graphic code or other means containing information or bits thereof adapted to reflect light and affixed to a coded object or target may thus be read when the graphic code is within the periphery of the target area 34 at the focal surface 35 or generally within the depth of field of the lens 22, the graphic code being illuminated by the pattern configured as the light beam 11 which is successively scanned across the graphic code in a plurality of directions by rotation of the scan. Light reflected from the illuminated graphic code will be detected by the photodetector 38 which is adapted to have a detection threshold enabling detection only when the shaped light beam 11 is scanned across the graphic code in a direction substantially orthogonal to the lengths of the individual parallel bars 68 (FIG. 5*a*) such that a detectable variation in reflected light intensity results. Furthermore, because beam 11 has a configuration shaped as each bit of information or, at least, not wider than spaces between the bits, the reading photodetector will be enabled to properly react to and read each passing bit of information.

As previously mentioned, the variation in the reflected light intensity is maximized by the length of the transverse cross-section of the lineal light beam 11 being generally superposable on the bars 68. Thus, when a graphic code consisting of a plurality of parallel vertical bars such as illustrated in FIG. 5a is to be read, it is preferred that a light beam having an elongate transverse cross-section be used wherein the length of the transverse cross-section of the light beam 11 is orthogonally oriented with respect to the direction of scan. Notably, if a graphic code consisting of a plurality of parallel diagonal bars is to be read, then the length of the transverse cross-section of the light beam 11 should be fixedly oriented at an angle with respect to the direction of scan, this being accomplished by the reorientation of the slit 14.

It is noted that in some instances it may be desirable to reduce the ambient background light intensity in order to enhance the operation of the detector 38. In such cases a dark surface, such as a black canopy, may be suspended over the target area 34 to provide a dark non-reflective background. It is understood that it would be within the scope, and spirit of the invention to employ any other method or apparatus for reducing the effect of excessive ambient background light.

Figure 5C:
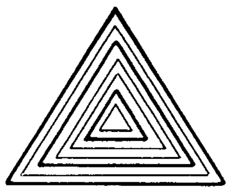
Figure 5B:
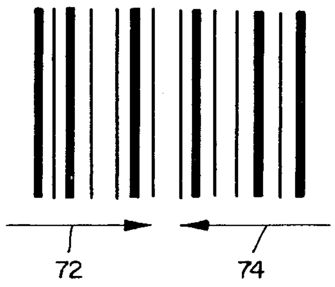

A plurality of exemplary graphic code configurations useable with the optical code reader of the present invention are illustrated in FIGS. 5*a*, 5*b*, and 5*c*. Referring to FIG. 5a, a basic directive graphic code configuration is illustrated which comprises a plurality of parallel bars 68 having either of two widths. Each bar corresponds to a bit of information and, in order to obtain a proper reading of all information, the graphic code must be scanned in the direction indicated by arrow 70. Any desirable numerical code, such as a binary code or other information, may be used. Notably, while the illustrated code configuration includes a plurality of parallel vertical bars, a plurality of parallel diagonal bars may be employed as well. Additionally, curved or oscillating lines may be employed instead of bars. The bar codes illustrated in FIG. 5*a* may be arranged in serial end-to-end relationship, as shown in FIG. 5*b*, to provide a symmetrical retrodirective code configuration which may be scanned in either of the two directions indicated by the arrows 72 and 74. A third useable code configuration, which is triangular in nature, is depicted in FIG. 5*c*. Notably, this configuration may be scanned in any of three directions but presents the disadvantage of a reduced variation in reflected light intensity at the center of the configuration. It is understood that it would be within the scope and spirit of the invention to use any of the conventional printing materials to prepare and affix the graphic code to an object to be coded. For example, the graphic codes may be printed on gummed labels or placed directly on the objects or targets to be coded. Further, a fluorescent material may be used to obtain enhanced or selective reflective qualities. Additionally, it is understood that colored or special inks or other materials particularly sensitive to radiant energy having selected spectral characteristics may be used.

Figure 3:
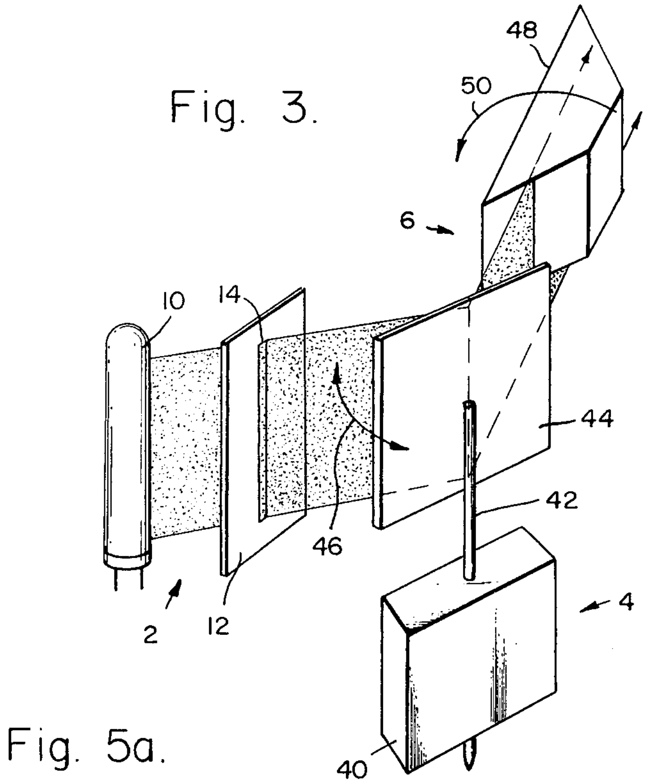
FIG. 3 is an isometric schematic diagram illustrating a modified rotatable bar pattern scanner in accordance with the invention.

As previously noted, the beam pattern scanner 4 of FIGS. 1 and 2 embodied by the mirror drum 16, when rotated in the direction indicated by the arrow 20, will repeatedly cause the light beam 11 to be scanned in the direction indicated by the arrow 17. However, a beam scanner 4, such as illustrated by FIG. 3, may be employed for scanning a light beam bidirectionally. Such bidirectional scan would present the potential advantage of reducing the detection time by one-half.

Thus, referring to FIG. 3, the scanner 4 may include an oscillograph motor 40 of conventional design equipped with an armature 42 having a reflector 44, such as a first surface mirror or polished metal plate, attached thereto. As is well known in the art, operation of the oscillograph motor 40 will result in the angular oscillation of the armature 42 about its longitudinal axis and thereby cause the attached reflector 44 to seesaw as indicated by the arrow 46. A shaped light beam 11 directed at the reflecting surface of the reflector 44 would thereby be scanned back and forth through an angle dependent on the angular oscillation of the armature 44. It is to be noted that while the use of an oscillograph motor permits the control of the light beam scan rate over a arrow range, such motor when operated at mechanical resonance provides a sinusoidal and thus non-uniform rate of scan which may be desirable in some applications.

Figure 4C:
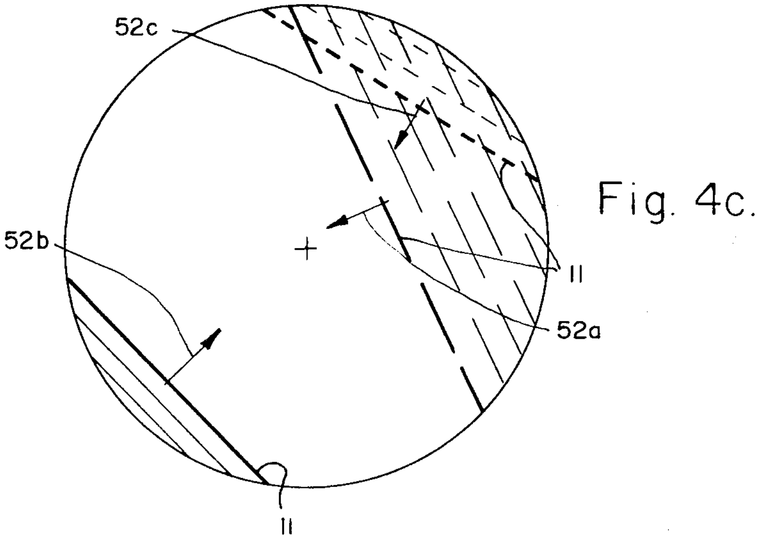

A scan rotator 6, such as the illustrated Dove prism 48 which is adapted to be rotated about its longitudinal axis, as indicated by the arrow 50, may be employed to rotate the scanned light beam, the result of which is illustrated by the graphical representation of FIG. 4*c*, wherein the arrows 52*a*, 52*b*, and 52*c* respectively indicate the direction in which the light beam 11 is scanned across a target area on successive sweeps.

Figure 6:
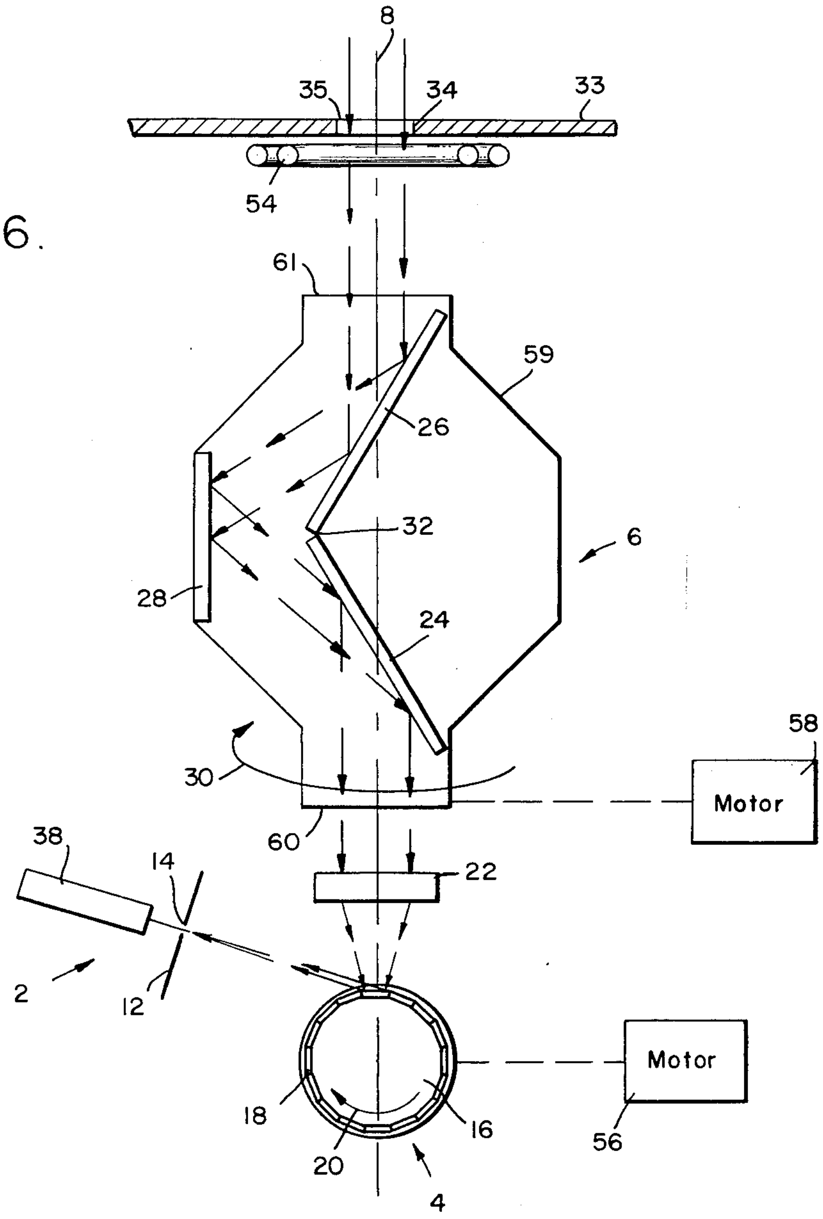
FIG. 6 is a schematic diagram illustrating a cross-sectional side view of a modified embodiment of the optical code reader of FIGS. 1 and 2.

The schematic diagram of FIG. 6 illustrates a cross-sectional side view of a modified embodiment of the code reader of FIGS. 1 and 2. The modification in effect consists of reversing the physical placement of the illuminating light source and the photodetector. As shown, a light source 54, or other source of electromagnetic energy radiation, which may be any of the conventional forms of lamps, is situated adjacent to the target area 34 such that it will serve to illuminate a graphic code stamped on or affixed to a coded object which is placed on or in close proximity to the surface 35 and within the periphery of the target area 34 for the purpose of being read. The pattern will thus comprise the graphic code or bits of information contained in the electromagnetic energy radiation. The beam rotator 6 will serve to rotate reflected the pattern comprising light images of the graphic code through predetermined angular increments about the axis 8, in a fashion previously explained, prior to being scanned across the slit 14 of the opaque mask 12 by the beam scanner 4, the slit being configured to accept sequentially each bit of information passing by the photodetector 38 is adapted to have a suitable detection threshold level and is situated to detect the varying light intensity resulting from the individual pattern bits of information passing through the slit 14 when they are rotated by the beam rotator 6 and scanned by means 4 so as to be positioned substantially parallel to and thereby become superposable with the slit 14.

Figure 7:
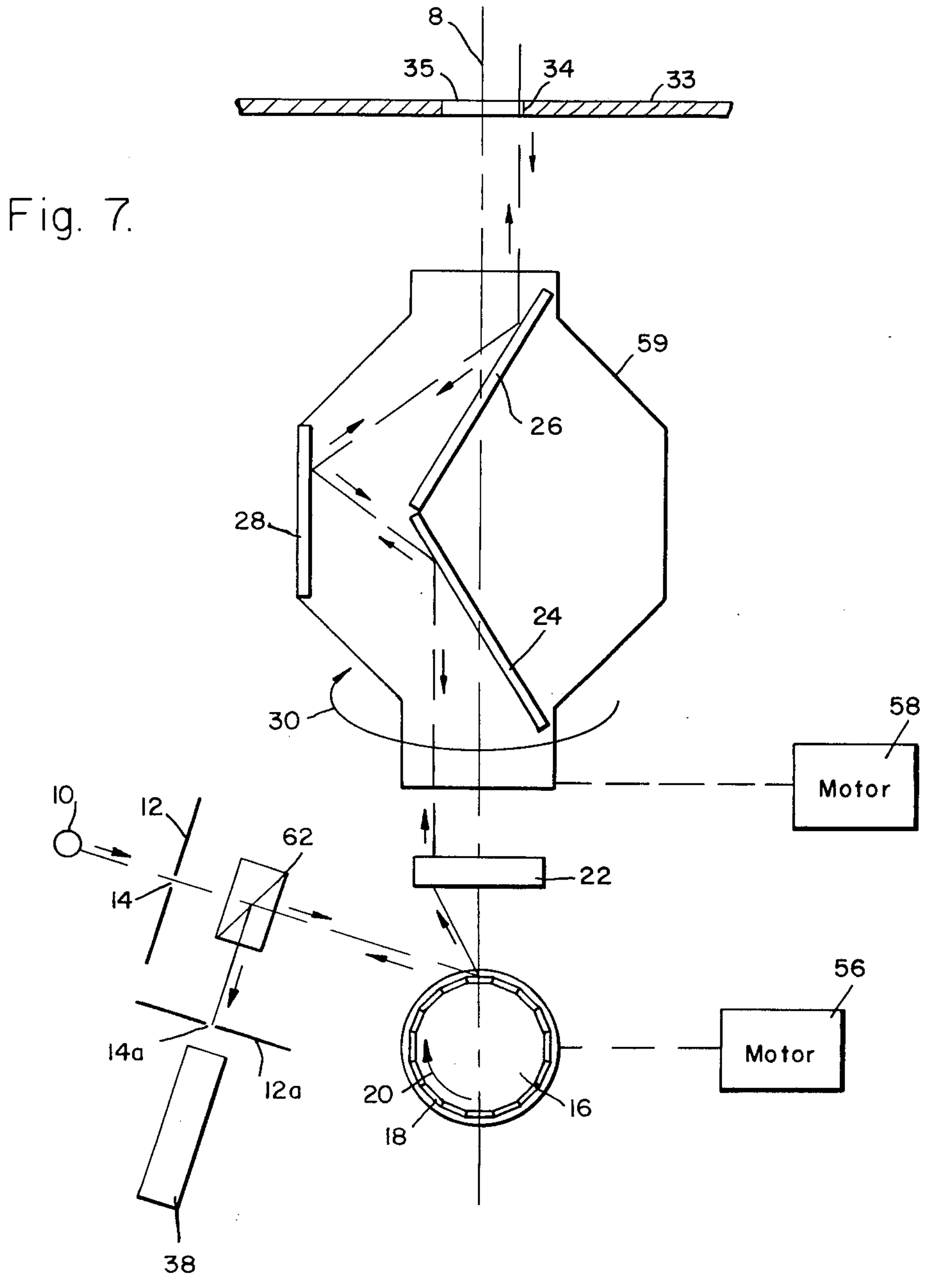
FIG. 7 is a schematic diagram illustrating a cross-sectional side view of a further modified embodiment of the optical code reader of FIGS. 1 and 2.

FIG. 7 depicts a further modified embodiment of the code reader of FIGS. 1 and 2. As illustrated, a beam splitter 62 of conventional design may be employed to allow a graphic code affixed to or stamped on a coded object and placed on or in close proximity to the focal surface 35 within the periphery of the target area 34 to be illuminated by the light beam 11, as described in connection with FIGS. 1 and 2, the resulting reflected light images of the graphic code being detected by the photodetector 38 situated and operating as described in connection with FIG. 6. It is to be noted that, while FIG. 7 illustrates a system including two masks, the mask 12 and the mask 12*a* which are respectively situated adjacent the light source 10 and the detector 38, it is necessary to include only one of the masks, either the mask 12 or the mask 12*a* so that only individual bits of information will be transmitted through the mask slit.

While preferred embodiments of the present invention have been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. An optical system for sequentially illuminating graphic bits of information positioned within a target area having an axis extending therefrom, the bits having a defined configuration, said system comprising:

first means for providing a shaped beam of electromagnetic energy radiation having a configuration conforming to the defined configuration of the bits;

second means situated along the axis for rotating incident radiations of the entire shaped beam about the axis and in a plane normal to the axis; and third means for forming radiations of the entire shaped beam on said second means by repeatedly scanning the entire shaped beam along a predetermined straight translational course perpendicular to the axis across said second means, the entire shaped beam configuration being fixedly oriented relative to the predetermined straight translational course.

2. The apparatus defined by claim 1 wherein said second means comprises:

rotator means for reflecting incident radiations of the beam an odd number of times.

3. The apparatus defined by claim 1 wherein said second means comprises:

a reflecting prism having the quality of internally reflecting incident radiations of the entire shaped beam an odd number of times prior to emergence therefrom, said prism being axially aligned on the axis; and means for rotating said prism about the axis.

4. The apparatus defined by claim 1 wherein said second means comprises:

first reflector means situated along the axis at an angle thereto for reflecting incident radiations of the entire shaped beam;

second reflector means situated parallel to the axis for reflecting incident radiations of the entire shaped beam in the direction of said first reflector means;

third reflector means situated along the axis at an angle thereto for reflecting incident radiations of the entire shaped beam in the direction of said second reflector means;

mounting means for retaining said first, second, and third reflector means in fixed positions relative to each other; and means for rotating said mounting means such that said first, second and third reflector means are in combination rotated about the axis.

5. The apparatus defined by claim 1 wherein said third means comprises:

a supporting member adapted for rotation about a longitudinal axis thereof;

a plurality of planar reflecting elements uniformly mounted on said support member.

6. The apparatus defined by claim 1 wherein said third means comprises:

reflector means having a planar reflecting surface for reflecting radiations of the entire shaped beam incident thereon; and means for turning said reflector means back and forth about a line lying on said planar reflecting surface.

7. The apparatus defined by claim 1 wherein said first means comprises:

an opaque mask provided with aperture means having a configuration conforming to the defined configuration of the bits; and a source of electromagnetic energy radiation positioned adjacent said opaque mask for projecting a beam of the radiation through said aperture means to provide the entire shaped beam configuration.

8. The apparatus defined by claim 7 wherein said second means comprises:

first reflector means situated along the axis at an angle thereto for reflecting incident radiations of the entire shaped beam;

second reflector means situated parallel to the axis for reflecting incident radiations of the entire shaped beam in the direction of said first reflector means;

third reflector means situated along the axis at an angle thereto for reflecting incident radiations of the entire shaped beam in the direction of said second reflector means;

housing means for retaining said first, second and third reflector means in fixed positions relative to each other; and means for rotating said housing means at a first rate of rotation such that said first, second and third reflector means are in combination rotated about the axis.

9. The apparatus defined by claim 8 wherein said third means comprises:

a drum-shaped member having a polygonal external periphery which drum-shaped member is adapted to be rotated about the longitudinal axis thereof at a second rate of rotation; and reflecting means mounted on the polygonal external periphery for reflecting radiations of the entire shaped beam incident on said reflecting means.

10. The apparatus defined by claim 9 wherein said reflecting means comprises:

a plurality of elongate reflecting elements uniformly secured in parallel juxtaposed relationship about the external periphery to form a reflecting surface including a plurality of contiguous sections.

11. The apparatus defined by claim 1 wherein said third means comprises:

a drum-shaped member having an external periphery which drum-shaped member is adapted to be rotated about the longitudinal axis thereof; and reflecting means mounted on the external periphery for reflecting radiations of the entire shaped beam incident on said reflecting means.

12. The apparatus defined by claim 11 wherein said reflecting means comprises:

a plurality of elongate reflecting elements uniformly secured in parallel juxtaposed relationship about the external periphery to form a reflecting surface including a plurality of uniform contiguous sections.

13. The apparatus defined by claim 1 wherein the rate of rotation of said second means is greater than the rate of rotation of said third means.

14. An optical system for reading a light reflective graphic code having a specific configuration, the graphic code being randomly placeable at a reading area and the reading area having an axis extending therefrom, said system comprising:

means for generating a light beam for reflection by the reflective graphic code;

means for selectively detecting the light beam reflected by the reflective graphic code in at least one orientation thereof; and multiple means including scanner means for scanning the light beam, rotator means for rotating the light beam, and configuration means operable upon the reflective graphic code with light to provide the light beam with the specific configuration whereby the entire light beam with the specific configuration is rotated and scanned across said detector means in a plurality of directions to enable detection of the entire light beam in at least the one orientation thereof.

15. The apparatus defined by claim 14 wherein:

said configuration means includes first means for providing the entire light beam with an elongate transverse cross-section defining the specific configuration;

said rotator means includes second means situated along the axis for rotating incident light images of the entire beam about the axis and in a plane normal to the axis; and said scanner means includes third means for forming light images of the entire beam on said second means by repeatedly scanning the entire light beam along a predetermined straight translational course across said second means, the elongate transverse cross-section being fixedly oriented relative to the predetermined course.

16. An optical system for reading a light reflective code including a plurality of linear indicia which code is placed at a reading area having an axis extending therefrom, said system comprising:

masking means having an aperture of preselected shape conforming to the shape of the linear indicia for limiting the amount of light projected therethrough;

detector means for detecting all of the light shaped by projection through said aperture;

scanning means for repeatedly sweeping light incident thereon across said masking means;

illuminator means for providing light images of the code by illuminating said reading area; and rotator means situated to receive and to rotate at least the entire light images of the code for projecting the entire rotated light images upon said scanning means by rotating the entire light images of the code about the axis and in a plane orthogonal to the axis.

17. The apparatus defined by claim 16 wherein said scanning means comprises:

a supporting member adapted for rotation about a longitudinal axis thereof;

a plurality of planar reflecting elements uniformly mounted on said support member.

18. The apparatus defined by claim 16 wherein said scanning means comprises:

a drum-shaped member having an external periphery;

a plurality of reflecting elements uniformly secured in parallel juxtaposed relationship about the external periphery to form a reflecting surface including a plurality of contiguous sections; and means for rotating said drum-shaped member about a longitudinal axis thereof.

19. The apparatus defined by claim 16 wherein said rotator means comprises:

reflecting means for reflecting incident light of the entire light images an odd number of times.

20. The apparatus defined by claim 16 wherein said rotator means comprises:

first reflector means situated along the axis at an angle thereto for reflecting incident light;

second reflector means situated parallel to said axis for reflecting incident light in the direction of said first reflector means;

third reflector means situated along the axis at an angle thereto for reflecting incident light in the direction of said second reflector means;

mounting means for retaining said first, second and third reflector means in fixed positions relative to each other; and means for rotating said mounting means at a first rate of rotation such that said first, second and third reflector means are in combination rotated about the axis.

21. The apparatus defined by claim 20 wherein said scanning means comprises:

a drum-shaped member having a polygonal periphery;

a plurality of elongate reflecting elements uniformly secured in parallel juxtaposed relationship about the external periphery to form a reflecting surface including a plurality of contiguous sections; and means for rotating said drum-shaped member about the longitudinal axis thereof at a second rate of rotation.

22. The apparatus defined by claim 21 wherein said drum rotating means and said mounting rotating means are so driven as to enable the second rate of rotation to be greater than the first rate of rotation.

23. In a system for reading bits of information each having a specific configuration at any physical planar orientation thereof, a mechanism for generating a straight translational scan of an electromagnetic energy radiation pattern in substantially parallel sequence and a rotation of the scan of the pattern comprising:

means for generating the entire pattern consisting of one of the group of patterns selected from a beam of electromagnetic energy radiation shaped substantially identical to the specific configuration of the bits of information and a beam of electromagnetic energy radiation incorporating the information contained in the bits of information;

scanning means angularly movable about a first axis for straight translational displacement of the entire pattern;

rotating means rotatable about a second axis normal to the first axis for receiving, rotating, and transmitting the entire pattern orthogonally about the second axis; and reader means for receiving the entire pattern containing the bits of information and capable of reading each bit of information in sequence.

24. A mechanism as in claim 23 wherein said means for generating the pattern comprises a source of electromagnetic energy radiation and aperture means configured to correspond to the specific configuration of each of the bits of information, said aperture means disposed adjacent said scanning means and parallel to the first axis.

25. A mechanism as in claim 23 wherein said reader means includes aperture means configured to correspond to the specific configuration of each of the bits of information.

26. A system for reading a code through a generation of a scan of an electromagnetic energy radiation pattern in substantially parallel sequence and a rotation of the scan of the entire pattern, comprising:

scanning means angularly moveable about a first axis and capable of receiving and transmitting the entire pattern to provide the scan;

rotating means rotatable about a second axis normal to and intersecting the first axis and capable of receiving an transmitting the entire pattern and having means for rotating the entire pattern orthogonally about the second axis to provide the rotation;

information means positioned on the second axis for reception of the pattern, said information means having at least one configuration conforming to the pattern; and information detecting means capable of detecting said information means at, at least, one particularly rotation of the scan of the pattern across said information means.

27. The system as in claim 26 further including aperture means irradiated by electromagnetic energy radiation to provide the pattern for transmission thereof along a plane parallely positioned to the first axis and to said scanning means for further transmission of the pattern to said rotating means.

28. The system as in claim 27 further including electromagnetic energy radiation splitting means positioned between said aperture means and said scanning means for reception of the radiation pattern containing information from said information means at the one particular rotation of the scan of the pattern across said information means.

29. A method of reading a graphic code incorporating a plurality of single element parallel linear indicia, which method comprises the steps of:

placing the graphic code in a position to be read;

reading the graphic code by means of a beam of electromagnetic energy radiation shaped substantially identical to the shape of a single element of the linear indicia; and detecting coincidence between the single-element beam and the single elements of the linear indicia of the graphic code by a slow rotational and a rapid straight translational relative scanning motion between the image of the graphic code and the electromagnetic radiation beam, resulting in the sequential reading of the entire graphic code pattern.

30. The method defined by claim 29 wherein the step of rotating and scanning the entire pattern further includes the step of:

sweeping the entire pattern by straight translation successively across the graphic code in a plurality of sweep directions, which sweep directions are changed by an angular increment subsequent to each successive sweep of the entire pattern across the graphic code whereby the entire pattern is fixedly oriented with respect to each of the sweep directions.

31. A system for reading stationary and moving codes through a scan of an electromagnetic energy radiation pattern in substantially parallel sequence after rotation of the entire pattern, comprising:

rotating means continuously and angularly movable about a first axis and capable of receiving and transmitting the entire pattern to provide the rotation;

scanning means rotatable at a rate greater than the rate of motion of said rotating means about a second axis normal to the first axis and capable of receiving and transmitting the entire rotating pattern and having means for displacing the entire rotating pattern orthogonally about the second axis to provide a straight sequential scan translation of the rotating pattern; and means for detecting the continuously rotated and scanned pattern.

32. An optical system for reading a light reflective graphic code having a specific configuration, the graphic code being randomly placeable at a reading area and the reading area having an axis extending therefrom, said system comprising:

means for selectively detecting a light beam reflected by the reflective graphic code in at least one orientation thereof; and multiple means including scanner means, illumination means, rotator means and configuration means operable upon the reflective graphic code with light to provide the light beam with the specific configuration and to rotate and to successively scan the entire light beam with the specific configuration across said detector means in a plurality of directions to enable detection of the entire light beam in at least the one orientation thereof, said configuration means including first means for providing the entire light beam with an elongate transverse cross-section defining the specific configuration, said first means comprising an opaque mask having an elongate aperture means and said illumination means comprising a source of light positioned adjacent said opaque mask for projecting a beam of the light through said elongate aperture means;

said rotator means including second means situated along the axis for rotating incident light images of the entire beam about the axis and in a plane normal to the axis; and said scanner means including third means for forming light images of the entire beam on said second means by repeatedly scanning the entire light beam along a predetermined straight translational course across said second means, the elongate transverse cross-section being fixedly oriented relative to the predetermined course.

33. An optical system for reading a light reflective graphic code having a specific configuration, the graphic code being randomly placeable at a reading area and the reading area having an axis extending therefrom, said system comprising:

means for selectively detecting a light beam reflected by the reflective graphic code in at least one orientation thereof; and multiple means including scanner means, illumination means, rotator means and configuration means operable upon the reflective graphic code with light to provide the light beam with the specific configuration and to rotate and to successively scan the entire light beam with the specific configuration across said detector means in a plurality of directions to enable detection of the entire light beam in at least the one orientation thereof, said configuration means including first means for providing the entire light beam with an elongate transverse cross-section defining the specific configuration;

said rotator means including second means situated along the axis for rotating incident light images of the entire beam about the axis and in a plane normal to the axis, said second means comprising means for reflecting incident light an odd number of times and means for rotating said rotator means about the axis; and said scanner means including third means for forming light images of the entire beam on said second means by repeatedly scanning the entire light beam along a predetermined straight translational course across said second means, the elongate transverse cross-section being fixedly oriented relative to the predetermined course.

34. An optical system for reading a light reflective graphic code having a specific configuration, the graphic code being randomly placeable at a reading area and the reading area having an axis extending therefrom, said system comprising:

means for selectively detecting a light beam reflected by the reflective graphic code in at least one orientation thereof; and multiple means including scanner means, illumination means, rotator means and configuration means operable upon the reflective graphic code with light to provide the light beam with the specific configuration and to rotate and to successively scan the entire light beam with the specific configuration across said detector means in a plurality of directions to enable detection of the entire light beam in at least the one orientation thereof;

said configuration means including first means for providing the entire light beam with an elongate transverse cross-section defining the specific configuration;

said rotator means including second means situated along the axis for rotating incident light images of the entire beam about the axis and in a plane normal to the axis; and said scanner means including third means for forming light images of the entire beam on said second means by repeatedly scanning the entire light beam along a predetermined straight translational course across said second means, the elongate transverse cross-section being fixedly oriented relative to the predetermined course;

said second means of said rotator means comprising first reflector means situated along the axis at an angle thereto for reflecting incident light of the entire beam; second reflector means situated parallel to the axis for reflecting incident light of the entire beam in the direction of said first reflector means; third reflector means situated along the axis at an angle thereto for reflecting incident light of the entire beam in the direction of said second reflector means; mounting means for retaining said first, second and third reflector means in fixed positions relative to each other; and mean for rotating said mounting means such that said first, second and third reflector means are in combination rotated about the axis.

35. An optical system for reading a light reflective graphic code having a specific configuration, the graphic code being randomly placeable at a reading area and the reading area having an axis extending therefrom, said system comprising:

means for selectively detecting a light beam reflected by the reflective graphic code in at least one orientation thereof; and multiple means including scanner means, illumination means, rotator means and configuration means operable upon the reflective graphic code with light to provide the light beam with the specific configuration and to rotate and to successively scan the entire light beam with the specific configuration across said detector means in a plurality of directions to enable detection of the entire light beam in at least the one orientation thereof, said configuration means including first means for providing the entire light beam with an elongate transverse cross-section defining the specific configuration;

said rotator means including second means situated along the axis for rotating incident light images of the entire beam about the axis and in a plane normal to the axis; and said scanner means including third means for forming light images of the entire beam on said second means by repeatedly scanning the entire light beam along a predetermined straight translational course across said second means, the elongate transverse cross-section being fixedly oriented relative to the predetermined course, said third means comprising a supporting member adapted for rotation about a longitudinal axis thereof and a plurality of planar reflecting elements uniformly mounted on said support member.

36. An optical system for reading a light reflective graphic code having a specific configuration, the graphic code being randomly placeable at a reading area and the reading area having an axis extending therefrom, said system comprising:

means for selectively detecting a light beam reflected by the reflective graphic code in at least one orientation thereof; and multiple means including scanner means, illumination means, rotator means and configuration means operable upon the reflective graphic code with light to provide the light beam with the specific configuration and to rotate and to successively scan the entire light beam with the specific configuration across said detector means in a plurality of directions to enable detection of the entire light beam in at least the one orientation thereof, said configuration means including first means for providing the entire light beam with an elongate transverse cross-section defining the specific configuration;

said rotator means including second means situated along the axis for rotating incident light images of the entire beam about the axis and in a plane normal to the axis; and said scanner means including third means for forming light images of the entire beam on said second means by repeatedly scanning the entire light beam along a predetermined straight translational course across said second means, the elongate transverse cross-section being fixedly oriented relative to the predetermined course, said third means comprising a spool-like element having an external periphery and a plurality of planar reflecting members uniformly secured about the external periphery to form a reflecting surface including a plurality of contiguous sections.

37. A system for reading a code through a generation of a scan of an electromagnetic energy radiation pattern in substantially parallel sequence and a rotation of the scan of the entire pattern, comprising:

scanning means angularly moveable about a first axis and capable of receiving and transmitting the entire pattern to provide the scan;

rotating means rotatable about a second axis normal to and intersecting the first axis and capable of receiving and transmitting the entire pattern and having means for rotating the entire pattern orthogonally about the second axis to provide the rotation;

information means irradiated by electromagnetic energy radiation to provide the pattern; and detecting means having stationary aperture means configured to conform to the configuration of the pattern, the pattern transmittable through said rotating means and said scanning means for reception by said detecting means through said aperture means, the rotation of the scan providing at least one alignment of the pattern with said aperture means.

38. An optical system for illuminating a target area having an axis extending therefrom, said system comprising:

first means for providing a shaped light beam having an elongate transverse cross-section;

second means situated along the axis for rotating incident light images of the entire shaped light beam about the axis and in a plane normal to the axis, said second means comprising:

first reflector means situated along the axis at an angle thereto for reflecting incident light of the entire shaped light beam, second reflector means situated parallel to the axis for reflecting incident light of the entire shaped light beam in the direction of said first reflector means, third reflector means situated along the axis at an angle thereto for reflecting incident light of the entire shaped light beam in the direction of said second reflector means, mounting means for retaining said first, second and third reflector means in fixed positions relative to each other, said mounting means comprising housing means including a pair of apertures which are aligned to permit the entire shaped light beam incident on either said first or third reflector means to be projected through said housing means, and means for rotating said mounting means such that said first, second and third reflector means are in combination rotated about the axis; and third means for forming light images of the entire shaped light beam on said second means by repeatedly scanning the entire shaped light beam along a predetermined straight translational course across said second means, the elongate transverse cross-section being fixedly oriented relative to the predetermined straight translational course.

39. An optical system for illuminating a target area having an axis extending therefrom, said system comprising:

first means for providing a shaped light beam having a fixedly shaped cross-section;

second means situated along the axis for rotating incident light images of the entire shaped light beam about the axis and in a plane normal to the axis, said second means comprising:

a reflecting prism having the quality of internally reflecting incident light of the entire shaped light beam an odd number of times prior to emergence therefrom which prism is axially aligned on the axis; and means for rotating said prism about the axis; and third means for forming light images of the entire shaped light beam on said second means by repeatedly scanning the entire shaped light beam along a predetermined straight translational course across said second means, the elongate transverse cross-section being fixedly oriented relative to the predetermined straight translational course, said third means comprising:

reflector means having a planar reflecting surface for reflecting light incident thereon; and means for turning said reflector means back and forth about a lineal axis lying on said planar reflecting surface.

40. An optical system for reading a light reflective graphic code when said graphic code is placed at a reading area having an axis extending therefrom, said system comprising:

light forming means for providing a light beam having an elongate transverse cross-section;

rotator means for illuminating said reflective graphic code with the entire light beam and for rotating the entire light beam on the reading area, said rotator means comprising apparatus means situated along the axis for rotating incident light images of the entire light beam about the axis and in a plane normal to the axis, said apparatus means comprising first reflector means situated along the axis at an angle thereto for reflecting incident light of the entire light beam, second reflector means situated parallel to the axis for reflecting incident light of the entire light beam in the direction of said first reflector means, third reflector means situated along the axis at an angle thereto for reflecting incident light of the entire light beam in the direction of said second reflector means, mounting means for retaining said first, second and third reflector means in fixed positions relative to each other, said mounting means comprising housing means including a pair of apertures which are aligned to permit light incident on either said first or third reflector means to be projected through said housing means, and means for rotating said mounting means such that said first, second and third reflector means are in combination rotated about the axis, and scanner means for forming light images of the entire light beam on said rotator means by repeatedly scanning the entire light beam along a predetermined straight translational course across said rotator means, the elongate transverse cross-section being fixedly oriented relative to the predetermined course; and means for selectively detecting light of the entire light beam reflected by said reflective graphic code.

41. An optical system for reading a light reflective code including a plurality of linear indicia which code is placed at a reading area having an axis extending therefrom, said system comprising:

masking means having an aperture of preselected shape for limiting the amount of light projected therethrough;

detector means for detecting all of the light projected through said aperture;
scanning means for repeatedly sweeping incident light across said masking means by linear translation;
illuminator means for providing light images of the code by illuminating said reading area;
rotator means situated to receive the entire light images of the code for projecting the entire rotated light images at said scanning means whereby the entire rotated light images are developed by successively rotating the entire light images of the code about the axis and in a plane orthogonal to the axis subsequent to each one of the entire rotated light images being swept across said masking means by said scanning means, said rotator means comprising
first reflector means situated along the axis at an angle thereto for reflecting incident light,
second reflector means situated parallel to the axis for reflecting incident light in the direction of said first reflector means,
third reflector means situated along the axis at an angle thereto for reflecting incident light in the direction of said second reflector means, and
mounting means for retaining said first, second and third reflector means in fixed positions relative to each other, said mounting means comprising housing means including a pair of apertures which are aligned to permit light incident on either said first or third reflector means to be projected through said housing means; and
means for rotating said mounting means at a first rate of rotation such that said first, second and third reflector means are in combination rotated about the axis.

* * * * *